US005370824A

United States Patent [19]

Nagano et al.

[11] Patent Number: 5,370,824

[45] Date of Patent: Dec. 6, 1994

[54] EMULSIFYING METHOD AND APPARATUS

[75] Inventors: Hideo Nagano; Yoshimi Ishigami, both of Shizuoka, Japan

[73] Assignee: Fuji Photo Film Co., Ltd., Kanagawa, Japan

[21] Appl. No.: 791,148

[22] Filed: Nov. 13, 1991

[30] Foreign Application Priority Data

Nov. 19, 1990 [JP] Japan .................................. 2-311549

[51] Int. Cl.[5] .......................... B01F 3/08; B01F 15/02; B01J 13/00

[52] U.S. Cl. .................................... 252/314; 252/312; 264/4.7; 366/135; 366/165

[58] Field of Search ................. 252/312, 314; 264/4.7; 366/135, 165, 263

[56] References Cited

U.S. PATENT DOCUMENTS 2,577,247 12/1951 Irwin .............................. 252/314 X
4,349,455 9/1982 Yamamura et al. ............ 252/314 X
4,454,083 6/1984 Brown et al. ........................ 264/4.7
4,824,823 4/1989 Pietsch et al. .................. 264/4.7 X
4,850,702 7/1989 Arribau et al. ................. 366/165 X

FOREIGN PATENT DOCUMENTS 56-139122 10/1981 Japan .
59-26129 2/1994 Japan .

*Primary Examiner*—Richard D. Lovering
*Attorney, Agent, or Firm*—Sughrue, Mion, Zinn, Macpeak & Seas

[57] ABSTRACT

An emulsifying device and method for obtaining emulsion by agitating mixed liquid having both dispersion liquid and disperse medium, includes an emulsifying body consisting of an outer cylinder and an inner cylinder positioned at an uniform clearance therebetween. The mixed liquid is applied to the clearance from an inlet positioned at one end of the circumference side of the outer cylinder, and discharged from an outlet positioned at another end of the circumference side of the outer cylinder. The inner cylinder is rotated around the same axis of the fixed outer cylinder, in which the mixed liquid is sufficiently emulsified by an uniform shearing force along the longitudinal direction of the inner cylinder.

5 Claims, 4 Drawing Sheets

EMULSIFYING METHOD AND APPARATUS

BACKGROUND OF THE INVENTION

1. Field of the Invention

This invention relates to a method and an apparatus for producing emulsion in which dispersion liquid is dispersed to a fine particle size in disperse medium, and more particularly to a method and an apparatus for producing emulsion having an uniform distribution.

2. Discussion of the Related Art

In the conventional method and apparatus for producing the emulsion, disperse medium and dispersion liquid are mixed by a preferable rate as a preliminary emulsion which is agitated by an emulsifying means, e.g. a high-speed agitator (dissolver), a homogenizer, an inline-mixer or the like, so that the stable emulsion which is emulsified to more fine particle size is produced.

When the emulsifying is performed by the above apparatus, required shearing force for the emulsifying greatly varies between far from and near by an emulsifying blade, because a region which the shearing force affects is limited around the emulsifying blades. Accordingly, there was a problem that the distribution of the particle size in the dispersion liquid was too wide.

Hereupon, devices which perform the uniform distribution of the particle size in the dispersion liquid are disclosed, e.g. a producing device of the dispersion liquid in which the shearing force supplying to the emulsion is increased continuously or stepwisely (Japanese Patent Application Laid-Open No. 59-26129); or a device which rotates an inner tube in the double tubes and supplies a preliminarily vibrated liquid into the body, so that the device occurs a flat current toward the current direction of an uniform liquid (Japanese Patent Application Laid-Open No. 56-139122).

There is a colloid-mill as the representative device of the former emulsifying device. In this device, however, the width (depth) of the emulsifying chamber is narrow as compared with the diameter of the chamber, and the supply of the mixed liquid to the device and the position of the outlet are not paid attention. As a result, the region which is effected by the uniform shearing force becomes narrow. The coarse particles, therefore, not to become small are discharged, and the "short-pass" phenomenon occurs. Specifically, when the flux is increased, the phenomenon is remarkable and causes the average size of the particles to be large and the distribution of the particles to broaden, in which the coarse particles remain. Accordingly, there is a defect that the device should be operated by low flux in order to obtain the emulsion having a narrow distribution of the particle size.

Regarding the latter, the device is used for producing a dispersion liquid including the large particles in 500 μm degree size. Generally, this device is not adapted to produce a fine particle dispersion liquid emulsion. Furthermore, the vortex of plane current between the inner cylinder and the outer cylinder causes the distribution of the shearing force to be uneven and the distribution of the particle size to broaden. Moreover, the supplying inlet and outlet of the liquid are disposed on the header at both sides of the double tubes. The liquid current, therefore, is apt to flow along the most short distance between the inlet and the outlet. In this case, namely, when the flux is increased, the short-pass phenomenon occurs and causes the distribution of the particles to broaden, in which the coarse particles remain.

With both conventional devices, there are defects that the distribution of the particles of the dispersion liquid broaden and a large quantity treatment cannot be performed.

SUMMARY OF THE INVENTION

Accordingly, an object of the invention is to provide an emulsifying device and method in which the above-described problems have been solved, and in which a simple system performs the small particle size, the uniform distribution of the particle size and the large quantity treatment.

The foregoing object of the invention has been achieved by the provision of:

(1) An emulsifying method for obtaining emulsion as a result of mixed liquid comprising both dispersion liquid and disperse medium being passed through the clearance between an inner cylinder and an outer cylinder, while the inner cylinder is rotated in the fixed outer cylinder, CHARACTERIZED in that; said mixed liquid is supplied from one end of the circumference side of said outer cylinder; while said mixed liquid is moved in said clearance to rotate around said inner cylinder, said mixed liquid becomes emulsion which is sufficiently emulsified by an uniform shearing force along the longitudinal direction of said inner cylinder; and said emulsion flows out from another end of the circumference side of said outer cylinder.

(2) An emulsifying apparatus which is provided with an outer cylinder and an inner cylinder having a clearance against the outer cylinder, in which the inner cylinder rotates around the same axis of the outer cylinder, CHARACTERIZED in that; said clearance between said inner cylinder and said outer cylinder is uniform along the longitudinal direction; a length L of said inner cylinder is equal or more than 0.6 times as the diameter D of said inner cylinder; an inlet of liquid positioned at one end of the circumference side of said outer cylinder; and an outlet of liquid positioned at another end of the circumference side of said outer cylinder.

Namely, the present invention in which the inner cylinder of the double cylinder formed by the outer cylinder and the inner cylinder is rotated, in which the clearance between the outer cylinder and the inner cylinder is determined to be narrow, include the method for obtaining the emulsion, wherein the mixed liquid of dispersion liquid and disperse medium is passed through the clearance. In the method, the inner cylinder length is determined more than 0.6 times as the inner cylinder diameter so as to be supplied the uniform shearing force to the mixed liquid. The clearance is supplied the preliminary emulsion, which is preliminarily emulsified, along the tangent direction of the circumference of one side of the outer cylinder, so that the preliminary emulsion is affected by the uniform shearing force more than the stationary time extending over the inner cylinder length.

DETAILED DESCRIPTION OF THE PREFERRED EMBODIMENT

Figure 1:
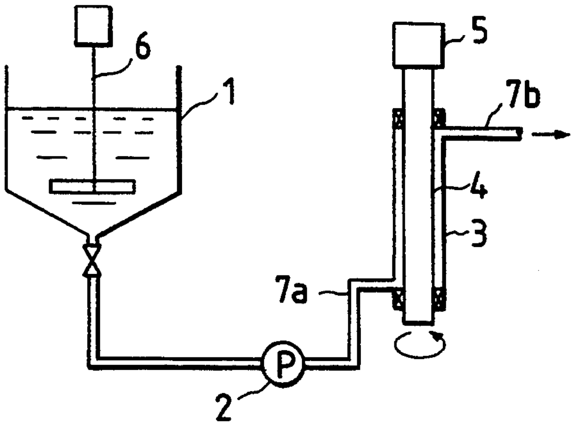
FIG. 1 is a summary side view showing one example of a device using a method according to this invention.
Figure 2:
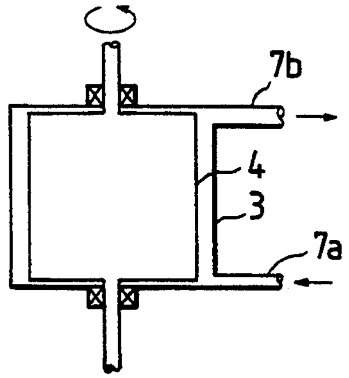
FIGS. 2–4 are sectional views of a portion showing other examples of inner and outer cylinders of the device according to this invention.
Figure 3:
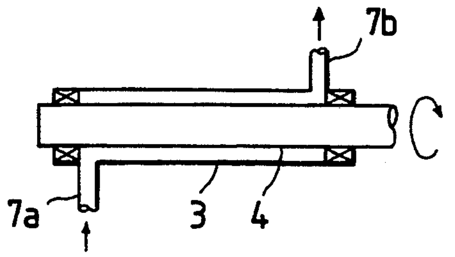
Figure 4:
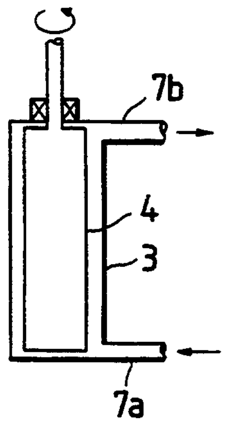
Figure 5:
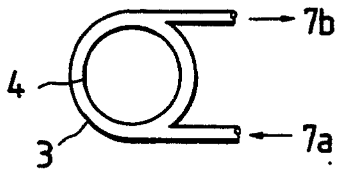
FIG. 5 is a summary plane view of one example of a device of this invention.

Embodiments of this invention will be described with reference to the Figures in detail. FIG. 1 is a side view showing one example of a device performing a method of the present invention. FIGS. 2–4 are sectional view showing other examples of the inner and outer cylinders of the present invention. FIG. 5 is a plane view showing a summary of one example of a device of the present invention.

In FIG. 1, the dispersion liquid and the disperse medium are compounded to a preferable rate in a preliminary emulsifying tank 1, in which the agitating machine 6 prepares a mixed liquid comprising an uniform ingredients, i.e., a preliminary emulsion. Hereupon, the preliminary emulsion is supplied to the clearance between an outer cylinder 3 and an inner cylinder 4 from an inlet 7*a* on the circumference surface of the under side of the outer cylinder 3. The inner cylinder 4 is rotated by a motor 5. The liquid supplied between the outer cylinder 3 and the inner cylinder 4 receive the uniform shearing force extending over the inner cylinder length while rotating in the clearance between the outer cylinder and the inner cylinder. After that, the liquid move toward an outlet 7*b* disposed on the circumference surface of the upper side of the outer cylinder 3. Finally, the liquid is sent to the next other treatment device, as the emulsion having the uniform particle size, through the outlet 7*b*.

On the other hand, the preliminary emulsion is, as shown in FIG. 5, supplied from the under side of the outer cylinder 3 and from the tangent direction along the circumference of the rotating direction of the inner cylinder 4, wherein the preliminary emulsion moves to the upper portion with circling. Hereupon, it is effective for obtaining the uniform emulsion to be discharged along the tangent direction from the outlet disposed on the circumference of the upper side.

Accordingly, the preliminary emulsion passing through between the outer cylinder 3 and the inner cylinder 4 is affected by the uniform shearing force during the stationary time without short-pass occurring so as not to maintain uneven particle size and to enhance the fine emulsifying, wherein the very uniform distribution of the particle size is realized in the emulsion.

In the method and device of the present invention, as the clearance between the outer cylinder 3 and the inner cylinder 4 is determined by the desired particle size and etc., the value is not prescribed. In generally, however, the value of 0.05–5 mm is preferable, and more preferable value is 0.1–2 mm.

When the clearance is narrower than the above value, the finish of the surfaces of the inner and outer cylinder and the distortion of the inner cylinder can influence the distribution of the clearance and make it uneven. Therefore, the distribution of the particle size is broadened by the uneven shearing force while the rotation speed of the inner cylinder is increased. Furthermore, there is a possibility that the inner cylinder will come in contact with the outer cylinder, thereby causing problems over a long period of time operation.

Alternately, of when the clearance is broad, in order to supply the shearing force to obtain the fine particle size, the rotation speed of the inner cylinder should be increased. However, the distribution of the particle size is broadened, because the fine particle is produced only adjacent to the circumference surface of the inner cylinder.

On the other hand, the stationary time sufficiently emulsifying the supplied liquid within the clearance is preferably equal or more than 0.02 sec., more preferably, equal or more than 0.2 sec. If the time is shorter than the above time, the short-pass phenomenon remaining the large particle occurs, and the distribution broadens.

The length of the inner cylinder is determined corresponding to the stationary time, preferably, equal or more than 0.6 times as the inner cylinder diameter D, more preferably, equal or more than 1.0 times.

The gist of the present invention is that the mixed liquid comprising both the dispersion liquid and the disperse medium is treated by the uniform shearing force during equal or more than a stationary time, so that the emulsion having an uniform distribution of the particle size is obtained.

Furthermore, in the device of the present invention, by means of adjusting the clearance between the inner cylinder and the outer cylinder and the rotating speed of the inner cylinder, the emulsified liquid comprising the desired particle size is obtained in one time passing, therefore, the emulsion can be continuously produced. FIG. 2 shows an example of the enlarged diameter cylinders. The same result is obtained such that the emulsified liquid comprising an uniform distribution of the particle size is produced.

FIG. 3 illustrates an example having horizontal cylinders, and FIG. 4 illustrates a construction receiving at only one side of the inner cylinder. In either case, the same result is obtained such that the emulsified liquid comprising an uniform distribution of the particle size is produced.

As described above, in accordance with the emulsifying device of the present invention, the emulsion is treated by the uniform shearing force during equal or more than a stationary time. As the result, an emulsion comprising the small particle size and an uniform distribution of the particle size is produced in large quantities. Moreover the emulsion can be continuously produced.

Embodiments of this invention will be described with reference to the examples in detail. However, the present invention is not restricted by the examples. Namely, it may be used to produce other micro-capsules, toner, medicine, chemicals and cosmetics.

EXAMPLES

Concrete Example 1

For the dispersion liquid, 10 parts by weight of Crystal violet lactone, 1parts by weight of Benzoyl leucomethylene Blue and 4 parts by weight of 3-[4-(dimethylamine)-2-ethoxyphenyl]-3-(2-methyl-1-ethyl 3-indolyl)-4-azaphthalide are dissolved in 200 parts by weight of diisopropylnaphthalene. Further, in this oily liquid, as polyvalent isocyanate, 16 parts by weight of carbodiimide-modified diphenyl methane-diisocyanate (commercial name [MILLIONATE MTL] manufactured by Nippon Polyurethane Co., Ltd.), 14 parts by weight of biuret (commercial name [SUMIDULE N-3200] manufactured by Sumitomo Beyel Urethane Co., Ltd.) of hexamethylene diisocyanate and 6 parts by weight of alkyleneoxide additive (the additive mole number of butylenoxide to ethylenediamine; 16.8 mol, molecular weight 1267) of amine are dissolved for execution.

Next, for the disperse medium, in 135 parts by weight of water, 15 parts by weight of poly(vinyl alcohol) are dissolved for execution.

In the device shown in FIG. 1, while the disperse medium is agitated at 800 rpm by a propeller agitator having a 70 mm diameter blade of an agitator 6, the above dispersion liquid is poured therein so as to prepare an oil drop in a water type emulsion as a preliminary emulsion liquid.

Further, in the device shown in FIG. 1, this preliminary emulsion liquid is treated for obtaining a desired emulsion by passing it through the emulsifying device in one time under the following conditions: 0.3–3 l/min flux; 0.5 mm clearance between the cylinders, the inner cylinder length L=200 mm; and 2000 rpm revolving speed of a motor 5.

Hereupon, the average particle size and the particle size distribution are measured by Coulter counter type TA-II. The average particle size is shown in FIG. 6 and FIG. 7 as line a, and the particle size distribution D90/D10 is shown in FIG. 8 and FIG. 9 as line a.

Comparison Example 1

Figure 10:
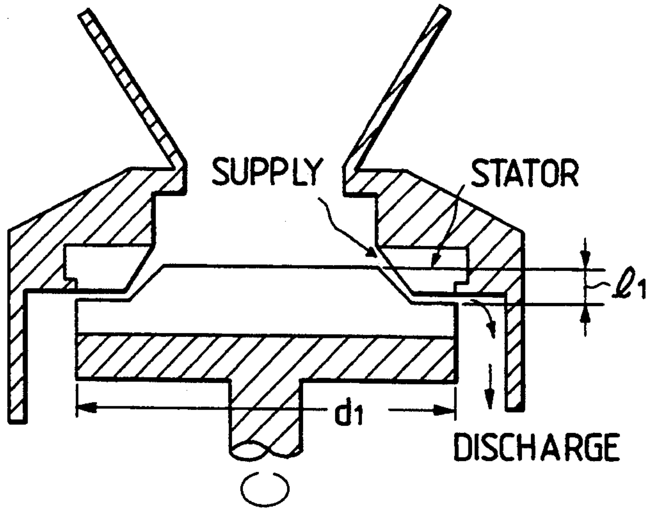
FIGS. 10 and 11 are sectional views showing conventional colloid-mills.
Figure 11:
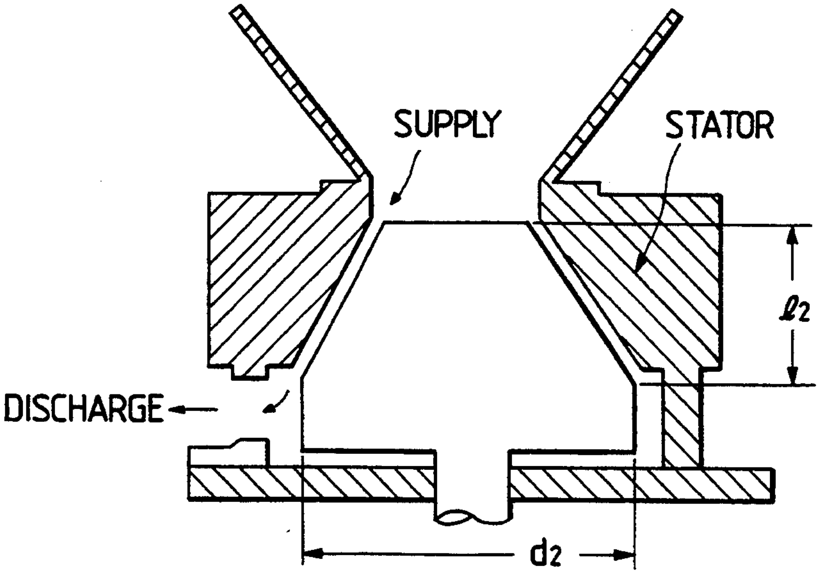

The preliminary emulsion of the above Concrete Example 1 is treated for obtaining a desired emulsion by a colloid-mill A (manufactured by Tokushu Kika Kogyo Co., Ltd.) comprising the rotor blade diameter $d_1=95$ mm and the depth length $l_1=13$ mm, in which the shearing force gradually or continuously changes as shown in FIG. 10, under the following conditions: the flux of 0.3–0.9 l/min; the clearance between a rotor and a stator of 0.5 mm; the revolving speed of 1500 rpm; and one time period. Hereupon, the average particle size and the particle size distribution are measured by Coulter counter type TA-II.

Figure 6:
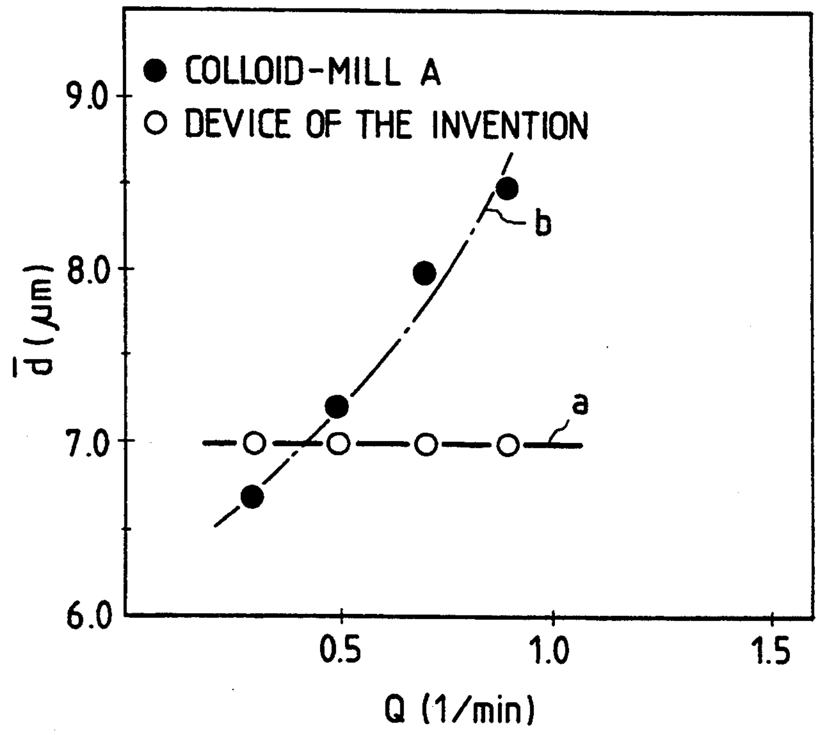
FIGS. 6 and 7 are graphical representations indicating a relationship between a flux and an average particle size comparing concrete example 1 with comparison examples 1 and 2, respectively.
Figure 7:
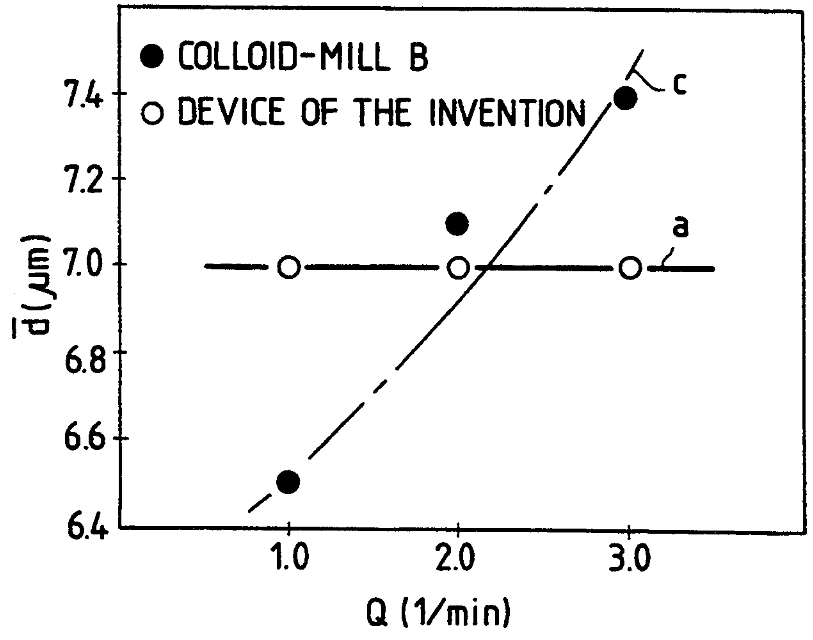
Figure 8:
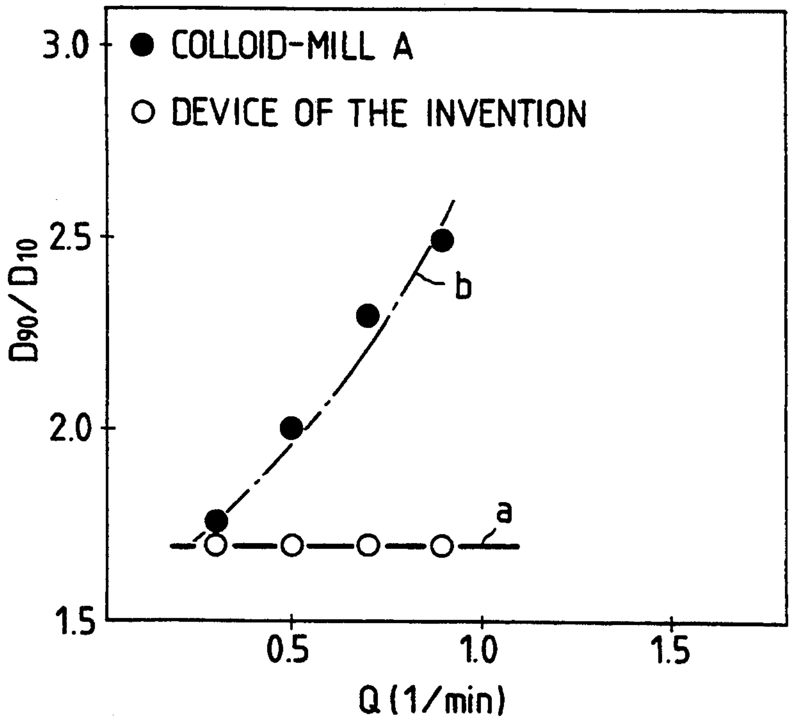
FIGS. 8 and 9 are graphical representations indicating a relationship between a flux and a particle size distribution comparing concrete example 1 with comparison examples 1 and 2, respectively.
Figure 9:
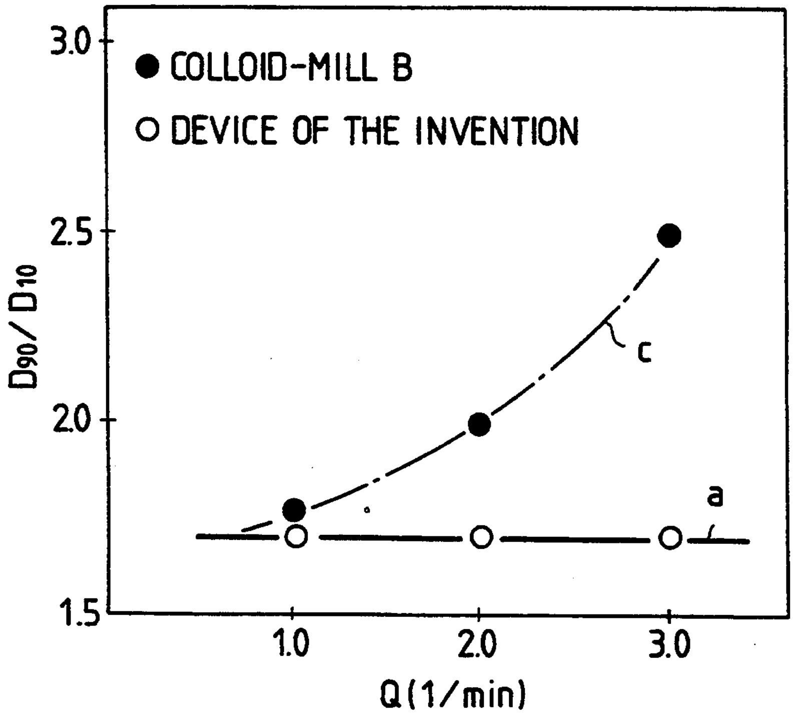

The average particle size is shown in FIG. 6 as line b, and the particle size distribution D90/D10 is shown in FIG. 8 as line b.

Comparison Example 2

The preliminary emulsion of the above Concrete Example 1 is treated for obtaining a desired emulsion by a colloid-mill B (manufactured by Nihon Seiki Seisakusho Co., Ltd.) comprising the rotor blade diameter $d_2=70$ mm and the depth length $l_1=40$ mm as shown in FIG. 10, under the followings conditions: the flux of 1.0–3.0 l/min; the clearance between a rotor and a stator of 0.5 mm, the revolving speed of 1500 rpm; and one time period.

Hereupon, the average particle size and the particle size distribution are measured by Coulter counter type TA-II.

The average particle size is shown in FIG. 7 as line c, and the particle size distribution is shown in FIG. 9 as line c.

Alternately, d in each Figure indicates an arithmetical average particle size. D10 and D90 indicate the particle sizes to 10% and 90%, respectively, calculated from an accumulated volume distribution. Furthermore, D90/D10 indicate a sharpness of the particle size distribution such that the particle size distribution is sharp in proportion to the low value of D90/D10.

As shown in FIGS. 6 and 7, the average particle size of the present invention is stable at 7 μm between the supplied flux of 0.3 l/m and 3.0 l/m. By contrast, the average particle size of the colloid-mills A and B fluctuates between the values of 6.4–8.6 μm relative to the supplied flux. Furthermore, the particle size distribution relative to the percent particle size calculated from the accumulated volume distribution is stable at D90/D10=1.7. By contrast, in the conventional colloid-mills, the value of D90/D10 fluctuates between 1.7–2.5. Therefore, using the conventional colloid-mill, the uniform average particle size and distribution is obtained only in a small range of flux.

As described above, the emulsifying method and the device according to the invention realize the continuous production of a large quantity of emulsion comprising the more uniform particle size distribution, as compared with the device that continuously increases the shearing force, such as the conventional colloid-mill.

What is claimed is:

1. An emulsifying method for obtaining an emulsion, comprising the steps of:

agitating both a dispersion liquid and a disperse medium thereby creating a mixed liquid;

supplying said mixed liquid to a clearance between an inner cylinder and an outer cylinder from a first end of the circumference of said outer cylinder;

passing said mixed liquid through said clearance thereby rotating said mixed liquid around said inner cylinder by rotating said inner cylinder in said fixed outer cylinder, whereby said mixed liquid is sufficiently emulsified by a shearing force that does not vary with the longitudinal position of said inner cylinder; and discharging said emulsion from a second end of the circumference of said outer cylinder.

2. An emulsifying method according to claim 1, wherein, in the step of supplying said mixed liquid, said mixed liquid is supplied to said clearance from a lower end of said standing cylinders and from a tangent direction along the circumference of a rotating direction of said standing inner cylinder; and in the step of discharging said emulsion, said emulsion is discharged along the tangent direction from an upper end of said standing outer cylinder.

3. An emulsifying method according to claim 1, wherein, in the step of supplying said mixed liquid, said mixed liquid is supplied to said clearance from a lower position of one side of said lying cylinders and from tangent direction along the circumference of a rotating direction of said lying inner cylinder; and in the step of discharging said emulsion, said emulsion is discharged along the tangent direction from an upper position of another side of said lying outer cylinder.

4. An emulsifying method according to claim 1, wherein the stationary time for sufficient emulsification of the supplied liquid within the clearance is equal to or more than 0.02 sec.

5. An emulsifying device for obtaining an emulsion by agitating a mixed liquid having both a dispersion liquid and a disperse medium, comprising:

an emulsifying body comprising concentric inner and outer cylinders having a uniform clearance therebetween, and means for rotating said inner cylinder about its axis, thereby producing a shearing force on a mixed liquid supplied to a circumferential clearance between said cylinders, said shearing force not varying with the longitudinal position of said inner cylinder;

an inlet, positioned at a first end of the circumference of said outer cylinder for supplying said mixed liquid into said clearance; and an outlet positioned at a second end of the circumference of said outer cylinder for discharging said emulsified liquid from said clearance, wherein said clearance ranges from 0.05-5.00 mm.

* * * * *